(12) United States Patent
Hendrickson

(10) Patent No.: US 6,203,418 B1
(45) Date of Patent: Mar. 20, 2001

(54) PRECISION TAXIDERMY AND FIELD-USE MICRO CUTTING SYSTEM

(76) Inventor: Doyle D. Hendrickson, 2930 E. 5th St., Casper, WY (US) 82609

( * ) Notice: Subject to any disclaimer, the term of this patent is extended or adjusted under 35 U.S.C. 154(b) by 0 days.

(21) Appl. No.: 09/263,643

(22) Filed: Mar. 5, 1999

(51) Int. Cl.$^7$ ........................................................ A22B 5/16
(52) U.S. Cl. ............................................. 452/132; 30/356
(58) Field of Search ................................... 452/132, 125; 30/155, 356

(56) References Cited

U.S. PATENT DOCUMENTS

| 579,655 | 3/1897 | Saladee et al. . | |
|---|---|---|---|
| 647,862 | 4/1900 | McLaughlin . | |
| 681,978 | 9/1901 | Richardson . | |
| 1,379,864 | 5/1921 | Gregory . | |
| 2,825,929 | * 3/1958 | Thornton | 452/137 |
| 2,906,021 | 9/1959 | Cromoga . | |
| 3,014,506 | 12/1961 | Crimmins et al. . | |
| 3,839,788 | 10/1974 | Addis | 30/287 |
| 5,038,479 | 8/1991 | Davis | 30/298 |

FOREIGN PATENT DOCUMENTS

| 2128532 | * 5/1984 | (GB) | 452/135 |
|---|---|---|---|

* cited by examiner

*Primary Examiner*—Willis Little
(74) *Attorney, Agent, or Firm*—Santangelo Law Offices, P.C.

(57) ABSTRACT

A precision micro taxidermy cutting instrument is provided which includes a single hold tailless frame member to which a pivotable body member is attached. The body member can provide a blade element which is concave and through which a lifting edge which cuts and a retention edge which cuts can both combine to provide a centering feature. This centering feature can be enhanced by blade body designs which also center through the use of an offset concave element. A chisel element can separate the hide from the viscera and through the selection of appropriate angles and the like, a continuous and precise cut can be made in taxidermy operations. The frame member can include a thumb rest as well as a rotational restraining element which are diametrically opposed and which can present roughly orthogonal forces. Flared separators can be included on the blade body member to further enhance the operation of the device. The open design, trademark named the "Flying Eagle™" feature is also provided through a variety of releasable locking mechanisms which permit pivoting and locking in place at various locations.

17 Claims, 5 Drawing Sheets

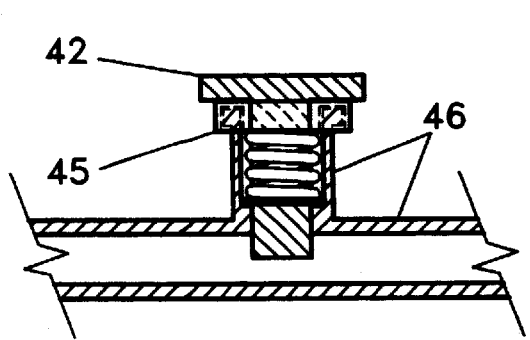
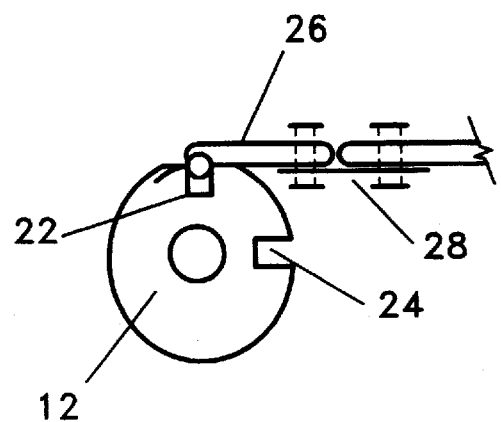
Fig. 9      Fig. 10
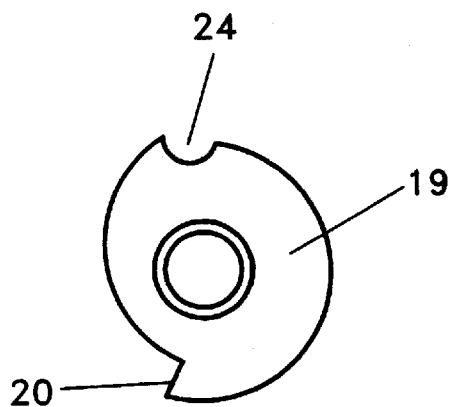
Fig. 11

PRECISION TAXIDERMY AND FIELD-USE MICRO CUTTING SYSTEM

I. BACKGROUND OF THE INVENTION

In general, this invention relates to the field of taxidermy cutting instruments, namely, those instruments which are used in the cutting and mounting of animals. Specifically, it relates to such instruments as they can be used for professional taxidermy purposes as well as portable instruments such as may be appropriate for field use. It also provides novel methods through which taxidermy functions can be achieved. These functions can include field dress cutting and actions appropriate to the preparation and preservation of the results of hunting activities.

Taxidermy is a field which likely has been in existence since man first learned how to hunt. Certainly its techniques and instruments have been the subject of improvement for many years. Throughout this century a number of improvements have been created which relate to the specific instruments used in taxidermy-type of applications. Over 40 years ago, M. V. Cromoga invented a skinning knife. This device was designed to address some known problems such as the device becoming fouled with hair, flesh or pieces of skin during the taxidermy process. The Cromoga invention, U.S. Pat. No. 2,906,021 shows that for many years those in the art had known some of the problems unique to and experienced by the taxidermy field.

Similarly, over 25 years ago, improvements were made on even that basic design. In U.S. Pat. No. 3,839,788 to Addis, improvements were addressed. More fundamentally however, as both the Cromoga and Addis inventions demonstrate, a variety of specialized tools may be needed to efficiently achieve the results desired. Perhaps what makes this field somewhat unique with respect to others which require some sort of cutting instrument, is the fact that in taxidermy applications, a variety of specific types of actions are required. These can range from splitting to trimming, to shaping, and the like. Each of these actions, and indeed each animal and location on the animal, can have specific requirements and unique challenges. For instance, in the act of splitting—that is, the separation of the epidermis from the dermis, or perhaps the upper portion of the viscera from the lower portion of the viscera—it can be a challenge to not only cut cleanly and uniformly, but also to be able to avoid damage to the meat or other anatomy below that which is desired to be cut.

This can be particularly challenging in a caping operation. In caping, the hide is desired to be separated from a location such as at the horns of an animal down the back of the neck to a lower location. In this type of operation not only is the need for a uniform and continuous cut desired, but there is the challenge of seemingly inevitable binding and fouling of the instrument as the cut proceeds causing uneven cutting. In spite of the fact that this persistent problem was recognized at least over 40 years ago, and in spite of the fact that this problem might be considered to have been attempted to be addressed in the Cromoga invention, the problem has persisted to this day. Additionally, because an important component of the entire taxidermy operation is proper field dressing and preparation, it has been desired not only to solve these problems but also to address them in a manner which provides an instrument which can be easily transported and which most optimally is a micro cutting-type of tool, that is, one of an extremely compact nature. Interestingly, while each of these problems and issues was well recognized by those skilled in the art for decades, until the present invention, no single tool seemed to optimally combine the appropriate capabilities and functions so that the various problems could be more optimally addressed.

As mentioned, the problems which this unique field has faced range from the practical to the operational. On the practical side it has been a desire to provide a maximally compact instrument which, while extremely small, does not compromise the ability for positive and precise control during its use. These two competing needs are particularly interesting as they may have been viewed (prior to the present invention) as having required a trade off from one to the other. As the present invention shows, this perception was not correct; it is possible to achieve both without an "inevitable" tradeoff.

On the operational side, the need for accurate and clean incisions has been somewhat of a challenge because in a taxidermy operation, unlike a medical-type of operation, hair and the like is not to be removed prior to making the incision. Thus, it has been a constant challenge to provide an instrument and a technique whereby the material on the surface of the skin does not obstruct or bind the incision on the hide itself. Interestingly, while this aspect was acknowledged and attempted to be addressed in the Cromoga invention, both it and the subsequent Addis invention each failed to recognize a key component to achieving the desired goals. Thus, while others had considered the problem and even addressed some of the components which now achieve the desired results, until the present invention no one had fully appreciated how the various components could be appropriately combined to achieve as successful a tool as the present invention. Thus, the present invention represents not just a minor advance over the prior art nor a gradual improvement in the prior art but rather, it represents a different approach which can be viewed to some degree as critical to effectively achieving the various goals desired.

The degree to which the taxidermy field has viewed its own problems as unique to it is evidenced to some degree by the fact that a variety of other cutting inventions have been made in other fields and yet their various features have not, to a large degree, been considered fully relevant to the unique challenges and demands of the taxidermy field. There has been over a century of effort for a variety of cutting tools as appropriate to cutting twine and the like. Over 75 years ago Gregory, in U.S. Pat. No. 1,379,864, had invented a twine cutter in the shape of a ring. This was in spite of the fact that prior to and in the early 1900s, other ring based, twine cutters had been invented. These included inventions such as that disclosed in U.S. Pat. No. 579,655 to Saladee, U.S. Pat. No. 681,978 to Richardson, and U.S. Pat. No. 647,862 to McLaughlin. These ring-based devices each represented improvement in their specific area, that of twine cutting. None of those various devices, though, apparently were viewed as particularly appropriate to the unique challenges of the taxidermy field. They do, however, seem to represent the small degrees of improvement which those involved in at least one other field have acknowledged.

Similarly, a device designed specifically for cutting plants such as flowers and the like at an appropriate angle was invented by Davis in U.S. Pat. No. 5,038,479. This relatively recent patent (1991) perhaps shows how each field can sometimes be viewed as having its own unique problems for which individual solutions apparently need to be fashioned. The specialization among fields is perhaps most highly shown in U.S. Pat. No. 3,014,506 to Crimmins in which a unique device for manipulating bundle straps is shown. As can be readily understood, this specialized device clearly has limited applicability to other fields. The present invention may in hindsight show how beneficial an expanded perspective can be to the taxidermy field. It should be understood, however, that because the taxidermy field has little in common with manipulating a bundling strap or the like, the value of expanding on concepts from other fields was not fully obvious. As the Cromoga invention demonstrates, while there could in hindsight be viewed some degree of similarity between various aspects of the various twine cutting devices and the Cromoga invention, this similarity did not generally appear to have been viewed as applicable to the challenges of a taxidermy-type of operation.

In spite of the fact that the various problems, challenges, and desires had long been known for the taxidermy field, and in spite of the fact that the implementing arts may in hindsight have been considered to be available to some degree, those in this field had not, prior to the present invention, been able to satisfy the needs and appropriately combine elements to achieve an instrument such as that of the present invention. It may even have been that those involved in the taxidermy field did not fully appreciate the nature of the problem or even that a problem existed. For instance, while the Cromoga and Addis inventions had attempted to solve some of the problems inherent in a long, continuous cut, it may be true that those involved in using such instruments simply accepted that problems such as binding and now precision cutting were inevitable, and that they could not be cleanly solved.

The present invention shows that by simply not accepting that the problem was inevitable and by fully appreciating the problem, it was possible to achieve a solution such as now available. Interestingly, even those attempts 25 and 40 year ago had not been expanded upon to solve such problems. To some degree, this may have been a result of a failure to fully understand the nature of the problem or to cope with the difficulties existing with these problems. In fact, as the present invention demonstrates, efforts such as those by Cromoga and Addis may have actually taught away from the direction of the present invention. To some degree it may even be true that the results can be considered unexpected to those skilled in the art who may have been lead to believe that solutions lie in the directions shown in the Addis and Cromoga inventions or who might have been lead to believe that the problem itself had difficulties which were to be considered inevitable. Thus, until the present invention no one had provided a precision micro cutting tool for a taxidermy application which could not only be compact but which could permit precise control throughout the entire operation and achieve the precise cutting desired without binding and with a minimal need for hand applied pressures.

II. SUMMARY OF THE INVENTION.

Accordingly, the present invention provides a single hole, tailless frame member with a foldable blade body with a replacement blade to create a foldable cutting surface which is designed to self center the hide after it is separated from the upper viscera and while it is being cut in a taxidermy operation. Through appropriate design the cutting instrument achieves methods of taxidermy operation which not only centers the hide, but also which separates it from the upper viscera and which separates the hide after it has been cut. This permits a clean and continuous incision. The device is designed to be folded and stored in a safe manner as well as to have replaceable blades so that it can be used for long periods of time in a cost effective manner.

Thus it is an object of the invention to provide a compact cutting instrument which can be used both in professional taxidermy as well as field operations. In keeping with this general object, it is a goal to provide a foldable device which appropriately shields the cutting surface so that it not only may be stowed and transported safely, but also so that the cutting surface does not become unnecessarily dulled.

Another object of the invention is to provide an instrument which is highly accurate in its use. In keeping with this object, it is a goal to provide a micro instrument which can be precisely held and used and which cleanly and easily separates the hide from the viscera. Another such goal is to provide a micro instrument which separates the cut portions of the hide and appropriately avoids tendencies to bind as the continuous incision is made.

Yet a further object of the invention is to provide a precision instrument which is both easy to use and which optimally applies and utilizes the various forces. Thus a goal is to minimize the forces needed to be applied by hand so that the taxidermy operation can be more easily and less painfully achieved.

Naturally, further objects of the invention are disclosed throughout other areas of the specification and claims.

III. BRIEF DESCRIPTION OF THE DRAWINGS

FIG. 9 is a schematic cross sectional view of the locking feature of FIG. 8

FIG. 10 is a schematic cross sectional view of another locking design

FIG. 11 is a side view of a camming locking design for an embodiment as shown in FIG. 2.

IV. DETAILED DESCRIPTION OF THE PREFERRED EMBODIMENTS

As can be easily understood, the basic concepts of the present invention may be embodied in a variety of ways. It involves both taxidermy techniques as well as instruments to accomplish the task. In this application, the techniques are disclosed as part of the results shown to be achieved by the various instruments described and as steps which are inherent to utilization. They are simply the natural result of utilizing the instrument as intended and described. In addition, while some device designs are disclosed, it should be understood that these not only accomplish certain methods, but also can be varied in a number of ways. Importantly, as to all of the foregoing, all of these facets should be understood to be encompassed by this disclosure.

Figure 1:
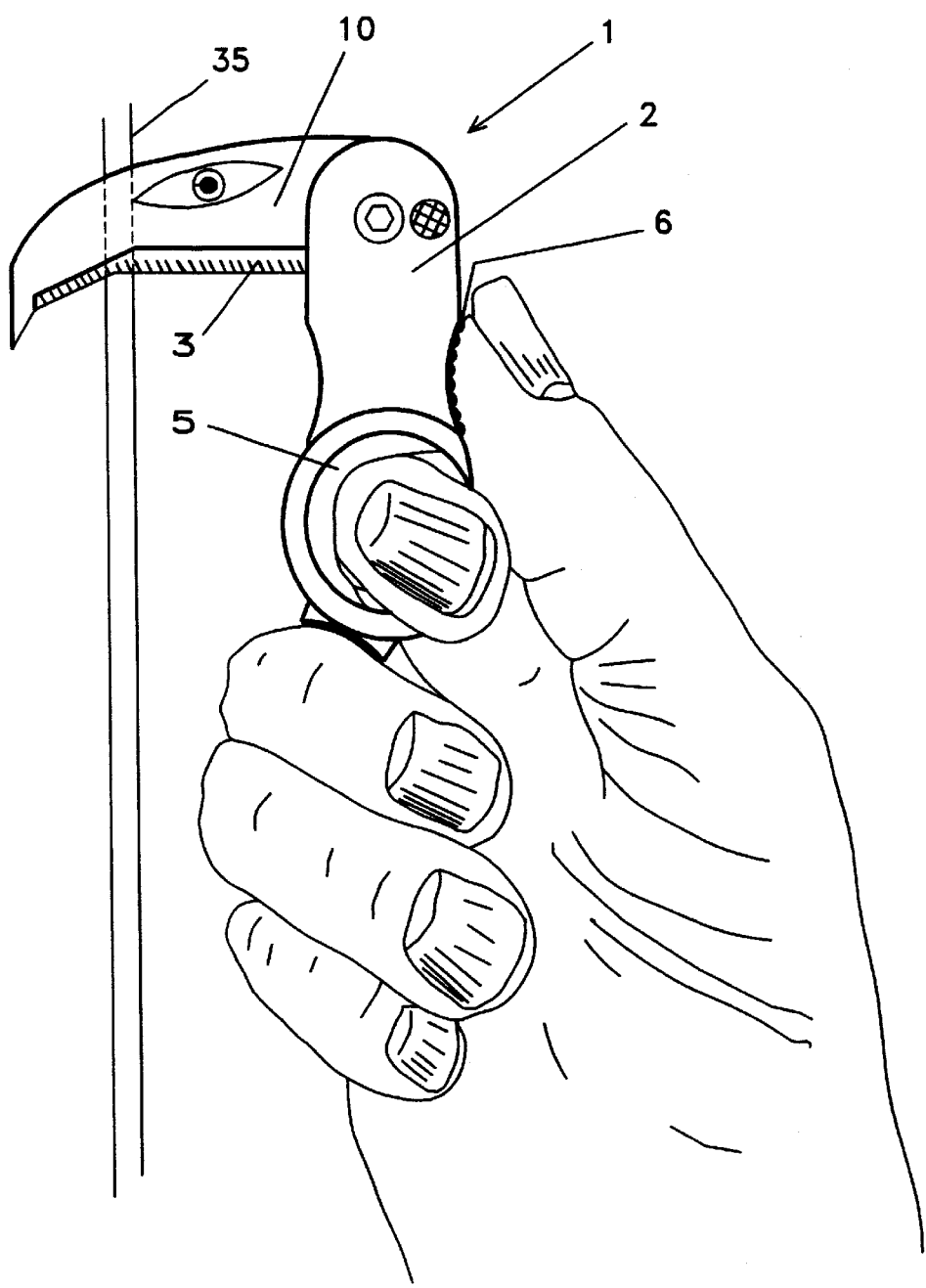
FIG. 1 is a side view of the cutting instrument being held in the hand and in the "Eagle™" position.

The basic concepts of the present invention may be embodied in many different ways. FIG. 1 shows a device or cutting system according to the present invention as it is designed to be used and held. This side view shows how the cutting instrument (1) can be held by one hand with the finger through the finger hole (5). This finger hole (5) can exist as part of a frame (2) which can be established with respect to the business end, namely, the cutting surface such as exists on the blade element (3).

Figure 2:
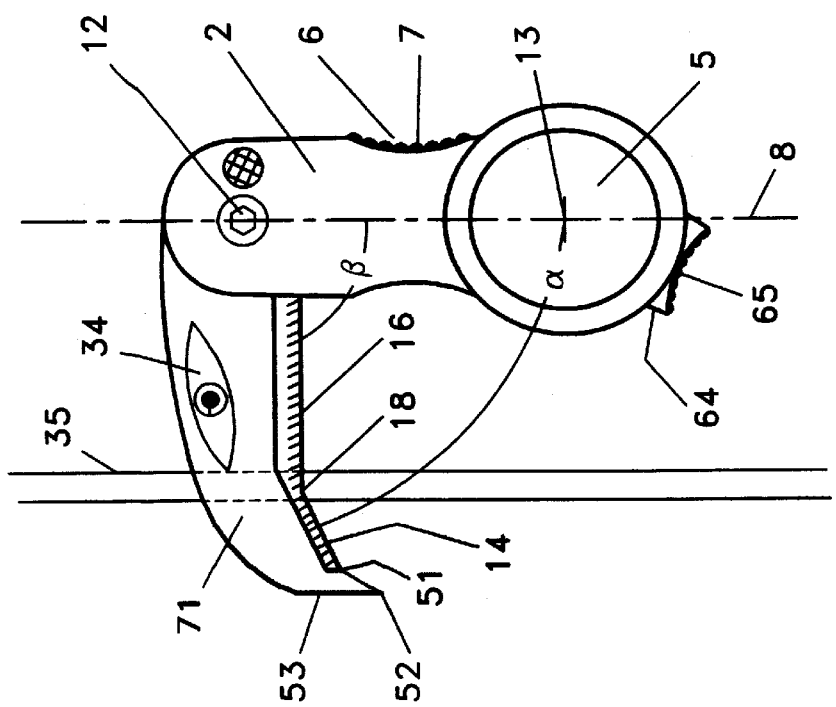
FIG. 2 is a side view of the cutting instrument as shown in FIG. 1 without being it held in the hand.

As may be readily appreciated from FIG. 2, the finger hole (5) can create a central rotational point or axis (13) about which rotation may need to be controlled. This can be accomplished through the use of thumb rest (6) and rotational restraining element (64). Each of these are discussed later. Through the finger hole (5), the frame member (2) presents a spatial relation to the cutting surface when the cutting instrument (1) is used. As can be seen, the frame member (2) can be designed as a single hole and tailless frame member. By tailless, it can be seen that the device does not present a separate substantial protrusion such as may have been previously viewed as necessary to control the device.

Referring to both FIGS. 1 and 2, it can be seen how the cutting instrument (1) can be used to achieve the taxidermy operation desired. As shown, by holding the cutting instrument with the index finger through finger hole (5), and by appropriately opening the device so that the blade element (3) is at the desired angle, the device can be inserted so that the chisel section (52) separates the hide from the underlying visceral sheath. As the device is manually held, and inserted at some separately existing incision, the chisel section (52) can be inserted under the hide (35) or other layer to be cut. By pressing the thumb against the thumb rest (6) on the frame member (2) and an adjacent finger against rotational restraining element (64) on the frame member (2), forces can be created such that the cutting instrument (1) is controlled as it is pulled down along the hide to create a clean and continuous incision at the desired location. As shown in FIG. 2, at the thumb rest (6) there can exist a thumb engagement surface (7) which can establish increased friction for better control of the cutting instrument (1). As explained later, the thumb rest (6) is positioned and configured so that the force created by the user's thumb creates a primary force direction which actually aides the operation and minimizes forces necessary to be applied by hand.

While the thumb rest (6) can create one of the more important forces necessary to achieve the taxidermy operation, it is desirable and at times can be critical to also provide the rotational restraining element (64). This rotational restraining element (64) can be designed so that it can also resist rotation about the central rotational axis (13). Unlike a separate tail or abutment as shown in some other devices, this rotational restraining element can achieve rotational restraint in both positive and negative directions. This can be accomplished through the finger engagement surface (65) which can be created so that it has an enhanced friction portion such as the serrations shown. Naturally other types of enhanced friction are also possible, the goal being that simply pressing the adjacent finger against the enhanced friction portion will provide an additional degree of rotational restraint and control. As the figures show, the thumb primary force direction and the finger primary force direction can be arranged to be substantially perpendicular or orthogonal.

Through the design, the frame member (2) may be responsive to the rotational restraining element (64). Naturally, the rotational restraining element could be a separate unit or integral as shown in the present design. This element, trademark named the "Power Point™" can be critical in that it provides both an enhanced frictional restraint and yet does so without increasing the size of the unit. It permits a tailless, single hole frame member (2). Interestingly, as the prior designs utilizing the tail or abutment seem to indicate, those in this field did not, prior to the present invention, understand the unnecessariness of such an abutment and even taught away from the compact design through their use of separate protrusions or finger holes. Perhaps to some degree they may not have fully appreciated that the problem was to provide a fully controllable compact design or may even have misunderstood that a single hole, tailless instrument could be considered to a degree critical to solving some of the problems existing.

As can be more clearly seen in FIG. 2, the rotational retaining element (64) can be positioned substantially diametrically opposed with respect to the thumb rest (6). As mentioned, by presenting roughly orthogonal force directions, these two elements can combine to create perpendicular control about the central rotational axis (13). Through this type of a design, a single hole can be used where only one finger is placed through the frame member (2). While, naturally, additional holes could be provided, such is believed unnecessary since the goal for a compact design now permits the frame member (2) to be only as sufficiently large as necessary to permit the single hole and the remaining portion of the frame member (2). Perhaps as further attesting the degree to which those in the taxidermy field did not view other fields as pertinent to their problems, other designs which have utilized separate friction elements have not been cleanly applied to the taxidermy field. Thus, to a degree that the present invention might be considered to combine elements that existed in other fields, these combinations had not apparently been obvious to those in the taxidermy field.

As mentioned earlier, the frame member (2) is designed to hold, and apply forces to the blade element (3). Blade element (3) can be attached to and held by a blade body member (10). This blade body member (10) can be responsive to the frame member (2) and may even pivot with respect to it. The blade element (3) can be connected (directly, indirectly, or through some intermediate element) to the blade body member (10) and can be held by the blade body member (10) in a variety of ways as discussed later.

Figure 5:
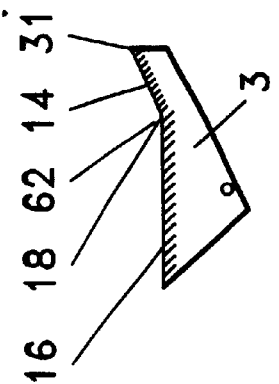
FIG. 5 is a side view of a removable blade for the instrument.

Perhaps one of the aspects of the invention which might be considered critical is the fact that the blade element (3) can provide both a lifting edge (14) and a retention edge (16). These are also shown in FIG. 5 as well. The lifting edge (14) of blade element (3) can serve to initially engage the hide (35) and begin the cutting action desired. Through proper orientation of the lifting edge (14), it can serve to lift the hide away from the viscera as it is cut. Unlike the Addis design, the present invention can actually act to center the hide as it is cut. This is accomplished through the use of the separate retention edge (16). As the hide (35) rides up as a result of the angling of the lifting edge (14), the hide (35) will likely eventually engage at least a portion of the retention edge (16). Through its proper orientation, and/or through the designs which separate the hide (35) behind the cutting edge, while the lifting edge (14) will tend to ride the hide (35) up, the retention edge (16) will tend to ride the hide (35) down. These competing forces can cause the hide (35) to tend to be centered during the cutting operation. This occurs at the point at which the lifting edge (14) and the retention edge (16) meet, namely, the junction point (18).

One interesting aspect of the invention is that while the Cromoga invention seemed to be designed so that it would ride the hide down and while the Addis invention seemed to be designed so that it would ride the hide up, prior to the present invention no design seemed to combine these two features such that there was an automatic centering feature as discussed above. This centering can be considered as achieved through a centering element (72). [For clarity this is shown on the folded instrument in FIG. 3b.] To a degree the centering function can be considered achieved by the proper selection of the various angles involved. Referring to FIG. 2 and the central axis (8), it can be seen that the lifting edge (14) presents a lifting edge angle (α). Similarly, the retention edge (16) presents a retention edge angle (β). As can be seen, the lifting edge angle (α) presents an angle of less than 90° with respect to the center line (8) of the frame member (2). Correspondingly, the retention edge (16) can present a retention edge angle (β) which is either greater than or about 90° with respect to the center line (8). Through this design, the cut material centering element (72) can be in part achieved.

Figure 6B:
FIG. 6b is an end point view of the blade body member showing the tapered width of the chisel section.
Figure 6A:
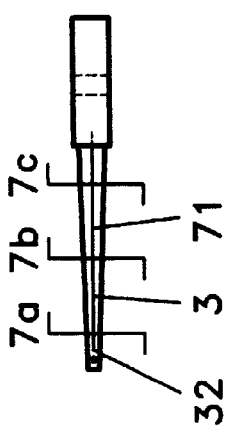
FIG. 6a is an end view of the blade portion of the instrument.
Figure 7A:
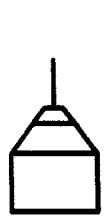
FIG. 7a–7c are cross sectional views of the blade portion of the instrument at three locations.
Figure 7B:
Figure 7C:

Further, the cut material centering element (72) can also include designs behind a portion of the cutting edge which assist in this function. For instance, as shown in FIGS. 2 and FIGS. 7a–7c, the blade body member (10) can present tapered surfaces or separating surfaces which can act to appropriately position the hide (35) as it is cut and after it has been cut. For the preferred design, the various tapers can be understood by reference to FIGS. 7a through 7c. These figures, representing cross sectional views taken at the lines shown in FIG. 6a show how the taper can vary. For instance, in FIG. 7(a), the first taper is shown as a constant taper which exists substantially throughout most of the area behind the lifting edge (14). As can be seen, the taper expands throughout the area behind the retention edge (16). As shown in FIGS. 7(b) and 7(c), the taper increases such that either its width or depth increases or the degree of separation may increase. Each of these can serve to more appropriately separate and position the hide so that it remains centered and achieves the desired cut. These features may even be designed for the hide to continuously ride up the retention edge as one long, continuous cut is made. Naturally, as those skilled in the art would easily understand, the tapers may be varied to a large degree by varying their width, their angle and curving them and the like.

Both the taper and the angle selected can combine additionally with the concave shape of the blade element (3) or with other features to achieve the desired centering effect. This concave feature can exist whether framed from curved or planer surfaces. As can be seen, the lifting edge (14) and the retention edge (16) can form an edge concave feature so that there is yet a further tendency for centering. This can be significant because as the hide (35) tends to ride up as a result of lifting edge (14), it can contact and actually be cut by the action of the retention edge (16). Unlike other designs where retention seems to have existed through an element which does not cut, the motion of the hide (35) with respect to the lifting edge (14) can actually be an advantage and can actually achieve increased cutting ability. Naturally, both the lifting edge (14) and the retention edge (16) can be designed such that they neither lift nor retain. This possibility might exist, for instance, when the other elements which serve to center the design are selected to be paramount.

For practical and other reasons, the blade element (3) can be designed so that it presents two substantially planer edges. Thus the lifting edge (14) could be a substantially planer lifting edge and similarly, the retention edge (16) could be a substantially planer retention edge. Unlike designs which present fully curved blades, this can have an added manufacturing advantage such that it is more easy and economical to create replacement blades and the like. A more automated design can be used and thus can provide a cutting instrument (1) which can be less expensive for the end user. As shown in FIGS. 2 and 5, the lifting edge (14) and the retention edge (16), when designed as substantially planer edges, can meet and also present a concave design with respect to each other.

By designing the retention edge (16) so that it can be oriented to present a roughly perpendicular cutting surface or by the thumb rest orientation (each with respect to the central axis (8)), the thumb rest (6) can serve to create a substantially perpendicular force on at least a portion of the cutting edge, namely, the retention edge (16). This substantially perpendicular force can be one of the elements that serves to optimize the forces needed to be applied by hand. It can also be an element whereby the device has enhanced cutting power specifically, that cutting power which is applied when the hide engages a portion of the retention edge (16).

Opposite the junction point (18) on the lifting edge (14), the lifting edge may have a terminus (51). This terminus (51) can have adjacent to it some type of visceral protector (53). This visceral protector (53) may also include a chisel section (52) as mentioned earlier. Through this design, by sliding the visceral protector (53) under the hide, the hide can be separated from the viscera without damage to the underlying anatomy. Again, for economical design, the chisel section (52) and visceral protector (53) can be designed as part of the blade body member (10). In such a design, the chisel section (52) need only be modestly sharp as its goal is not to cut but to merely separate viscera from the skin. Rounded designs to some degree may work, however, it is believed that a completely rounded design, unless the radius is sufficiently small to cleanly separate and yet sufficiently large to avoid cutting, would not present an optimal selection. For optimal separation, even when caping, the chisel section (52) can taper across its width and height. It may also provide its height taper all the way up to near where the hide may contact the blade element (3). Each of these can contribute to more precise separating, and consequently more precise cutting. The taper across the width can also facilitate use for work on fish, such as in entering the vent jar eviscerating Once the hide (35) is cut by the cutting surface of the blade element (3), the cutting instrument is designed so as to separate the cut portions of the hide (35) as it is pulled through its action. This is done through the use of some type of cut material separator (71). As shown on end in FIG. 6 and from the side in FIG. 3b, the cut material separator (71) can consist of a first flared separator (73) and a second flared separator (74). As mentioned earlier, with respect to the tapers involved, these two elements can serve to separate the hide (35) as it moves away from the cutting edge. They can serve to force the hide (35) apart immediately after it is cut as they are positioned in the present design behind at least a portion of the cutting edge. By forming them as part of the blade body (10), the first flared separator (73) and the second flared separator (74) can be integral and economically designed. As shown, the first flared separator (73) is positioned behind at least a portion of the lifting edge (14). It has both front and back portions, the front being closer to the cutting surface. The second flared separator (74) cannot only have front and back portions, but also top and bottom portions. As shown, the top portion (75) is positioned away from the lifting edge (14) whereas the bottom portion (76) is positioned closest to the lifting edge, namely, near the junction point (18).

As mentioned earlier, and as shown in FIGS. 7a–7c, the second flared separator (74) can expand from its bottom portion (76) to its top portion (75). These first and second flared separators (73 and 74) can actually form a portion of the blade body (10) and can form their own concave feature. This can be significant as it can present yet another aspect as to why the hide (35) centers as it is cut by the cutting instrument (1). Further enhancing the design is the fact that the front edge (63) of the second flared separator (74) can be designed so that it is roughly parallel with the front edge of the retention edge (16), or at least some part of the blade element (3). This concave feature on the blade body member (10) can serve to alter the amount of force applied to the hide (35) as it rises along the retention edge (16). Thus, in this design both blade element (3) and blade body (10) present concave features to hide (35) when it is used.

It may also be desirable to present not only dual concave surfaces but also offset concave surfaces. Referring to FIG. 2, this aspect can be understood. As shown, the blade element (3) can present an edge center at junction point (18). By presenting a line which equally divides the angles between the lifting edge (14) and the retention edge (16), an edge center can be shown extended. Instead of presenting the junction between the first flared separator (73) and the second flared separator (74), namely the blade body center (62) immediately behind and on that bisected angular line, the blade body center (62) is shown as offset with respect to the edge center of the edge concave feature of the element (3). In this fashion the hide (35) can actually position itself as centered on both these two centering elements as it is cut. Thus, it can be helpful to have the edge center and the blade body center (62) offset so that they actually align with the hide (35) as it is cut in normal use. Thus, these two features by being offset more closely approximate the likely location at which the hide (35) will travel as it passes by the cutting instrument (1) in use. Naturally, it is possible for yet a third centering element to be included, namely an appropriately offset junction point between the back edge of the first and second separators or even some other type of element on blade body member (10). Again, this could further be aligned with the hide (35) in use as well. These offsets can each help as the blade become duller so that the hide (35) will have less of a tendency to ride up the retention edge (16). Again, this separator design can be viewed as critical to a degree and as something those skilled in the art failed to fully understand and even taught away from. To some degree those skilled in the art may not have appreciated the various forces on the knife whether through the thumb rest (6) or from the hide (35) itself, may not have appreciated the orthogonal and diametrically opposed force applications possible in this design and how the various elements can synergistically combine to achieve the desired result.

Of practical value is the fact that the design presents a design which can be folded through the use of a design such as that which includes pivot element (12). Pivot element (12) can serve to permit the blade body member (10) to pivot with respect to the frame member (2). This can be achieved in a variety of designs as mentioned later. By presenting a foldable blade body member (10), the blade element (3) itself can be pivoted and even inserted and shielded by a portion of the frame member (2). This can be accomplished by providing a split portion or blade body cavity (11) as part of the frame member (2). As simple as this may seem in hindsight, the combination of a folding blade body member (10) and blade body cavity (11) apparently was not viewed as an obvious element to include in prior designs to the degree shown here. This may be novel in its own right. As shown, blade body cavity (11) on the frame member (2) is configured so as to shield the blade element (3) from both sides. Unlike other designs which shielded it only on one side, this feature serves both as an enhanced safety element and also to protect the blade element (3) since it is desired to remain as sharp as possible for taxidermy use. It can accomplish a shielding by folding the blade body member (10) so that it and perhaps most of the blade element (3) is inserted into the finger hole (5). Thus the blade body cavity (11) by being provided in the vicinity of finger hole (5) can provide greater safety and more compact use of space in transport of the folded cutting instrument (1).

Figure 3A:
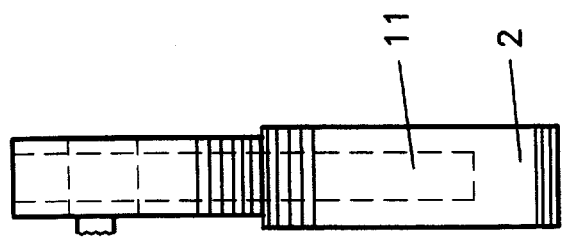
FIG. 3a is an end view of the folded instrument.
Figure 3B:
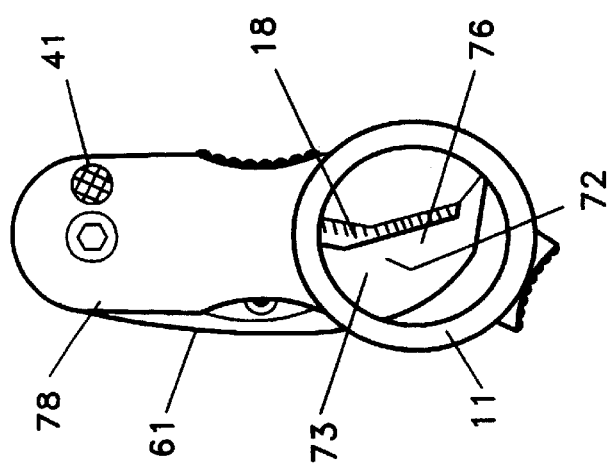
FIG. 3b is a side view of the folded instrument.

As further shown in FIG. 3b, when folded, the foldable blade body member (10) can present an aligned surface with the frame member (2). This can serve to enhance the structure as it exists in its folded shape. Thus, the external frame surface and the external blade body surface such as that shown for blade back portion (61) and frame front portion (78) can align to at least some portion when the blade is fully folded. While the safety of having the element shielded from both sides again seems obvious, it appears that those skilled in the art had not fully appreciated this desire and to some extent might have been considered to design away from the present invention. Thus, the shielding element might be considered as yet another potentially critical element which can be important to the over all success of the design.

Figure 4:
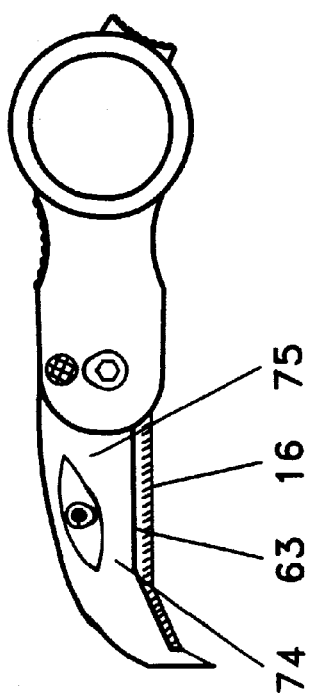
FIG. 4 is a side view of the fully opened instrument in the "Flying Eagle™" position

To facilitate the folding, opening, and closing of the cutting instrument (1), a releasable pivot lock (41) may be included. This releasable pivot lock (41) can be provided in a variety of designs. For instance, as shown in FIGS. 8 through 11, a variety of designs can be included. Each of these may be designed so they detachably prevent the opening, closing or other pivoting of the blade. In order to release the lock, some element may be moved so that the blade may then be pivoted, it may then also lock in its newly selected position. These positions of locking may include three: a closed position as shown in FIG. 3, an opened position as shown in FIG. 2 (trademark named the "Eagle™" position), and a fully extended position feature as may offer ancillary use of the instrument (trademark named the "Flying Eagle™" position) as shown in FIG. 4. Each of these can be roughly orthogonal positions such that their various goals can be achieve to the maximal extent.

Figure 8:
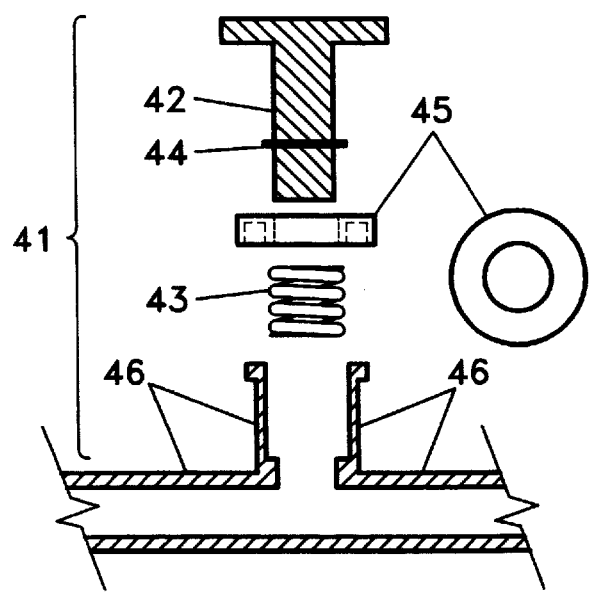
FIG. 8 is an exploded view of a locking feature for one embodiment.

Referring to FIGS. 8 and 9, one type of locking design is shown. This design can include a pin (42) which is urged in one direction by some type of spring element (43). This spring (43) can be retained by a pin retainer (44) which is held in place by a lock cap (45) through attachment to a pivot lock body (46). As those skilled in the art would easily understand, this design could be used such that with slots or the like, the pin (42) could act upon some portion of the blade body member (10) or even upon some separate cam (19) (shown in FIG. 11). Through this type of a design the releasable pivot lock (41) might serve to yieldably urge the pin (42) against at least one of the pivoting elements.

Additional designs for the releasable pivot lock (41) are shown through the elements depicted in FIGS. 10 and 11. As shown in FIG. 10, the design can include a pivot element (12) which may include first blade and second blade notches (22 and 24). These first and second blade notches (22 and 24) may be designed to interact with a latch (26) which may include some type of leaf spring (28).

FIG. 11 shows a cam (19) designed so that some type of releasable pivot lock (41) could be used so as to permit opening and stopping of the design at a blade stop (20). This design can also include blade notches such as second blade notch (24) as shown. In this fashion the blade body member (10) could be easily closed without any need to manipulate the releasable pivot lock (41). This could serve to add safety so that the device can be closed easily but not opened without the appropriate manipulation.

Finally, the cutting instrument (1) may be designed so as to provide replaceable blade possibilities. For this, blade body member (10) may include a blade retention cavity (32) (shown as a slit in FIG. 6) into which a blade element (3) could be positioned. This blade element (3) could be retained through some type of retaining element (34) so that once the replaceable blade is inserted into the blade retention cavity (32) or some other adaptation for insertion in the blade body member (10), the replaceable blade can be held against the blade body member (10) through a retaining element (34) (shown in FIG. 2). This retaining element (34) may be a single retaining element such as a screw, a pin, adhesive or other type of element and may include a recess (the Eagle Eye™" portion as shown). Through these designs, a plate to hold the blade can be avoided and replacement can be simplified. Thus, the use of cutting instrument (1) can involve removing the blade element (3) and replacing it by inserting the replacement blade into the slit (32) and retaining the replacement blade within or against the blade body member (10)

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function.

In addition, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. All permutations and combinations of the various elements are also possible and should be understood as disclosed. Further, it should be understood that as the disclosure relates to elements of the invention, the words for each element may be expressed by equivalent apparatus terms or method terms— even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "lifting edge" should be understood to encompass disclosure of the act of "lifting"— whether explicitly discussed or not—and, conversely, were there only disclosure of the act of "lifting," such a disclosure should be understood to encompass disclosure of a "lift element." Such changes and alternative terms are to be understood to be explicitly included in the description.

I claim:

1. A taxidermy and field-use micro cutting system comprising:
   a. a single hole, tailless frame member having a central rotational axis through said single hole;
   b. a blade element connected to said tailless frame member opposite said single hole, said blade element having a cutting edge;
   c. a thumb rest located on said tailless frame member intermediate said blade element and single hole; and
   d. an enhanced friction rotational restraining element located on said tailless frame member adjacent said single hole and substantially diametrically opposed with respect to said thumb rest, said restraining element permitting rotational restraint about said central rotational axis.

2. A taxidermy and field-use micro cutting system as described in claim 1 wherein said thumb rest has a thumb engagement surface with a thumb primary force direction, wherein said diametrically opposed, enhanced friction rotational restraining element has a finger engagement surface with finger primary force direction and wherein said thumb primary force direction and said finger primary force direction present roughly orthogonal force directions.

3. A taxidermy and field-use micro cutting system as described in claim 1 and further comprising a blade body member which is connected in some fashion to said tailless frame member and which holds said blade element.

4. A taxidermy and field-use micro cutting system as described in claim 3 wherein said blade element is pivotally responsive to said tailless frame member.

5. A taxidermy and field-use micro cutting system as described in claim 4 wherein said blade body member comprises a foldable blade body member which pivots to shield at least a portion of said cutting edge of said blade member by said tailless frame member.

6. A taxidermy and field-use micro cutting system as described in claim 5 and further comprising a blade body cavity on said frame member wherein said blade body cavity is configured to shield at least a portion of said cutting edge of said blade element inside said finger hole when said blade body member is pivoted with respect to said frame member.

7. A taxidermy and field-use micro cutting system as described in claim 6 wherein said cutting edge comprises:
   a. a lifting edge; and
   b. a retention edge configured such that said lifting edge and said retention edge form an edge concave feature with respect to each other,
   and further comprising a cut material separator positioned behind at least a portion of said cutting edge.

8. A taxidermy and field-use micro cutting system as described in claim 7 wherein said cut material separator positioned behind at least a portion of said cutting edge comprises:
   a. a first flaired separator positioned behind at least a portion of said lifting edge and which has a front and a back portion; and
   b. an offset second flaired separator which is offset as compared to said first flaired separator and which has a top and a bottom portion.

9. A taxidermy and field-use micro cutting system as described in claim 8 wherein said lifting edge comprises a substantially planer lifting edge, wherein said retention edge comprises a substantially planer retention edge, and wherein said cutting edge further comprises a junction point at which said substantially planer lifting edge and said substantially planer retention edge meet such that said substantially planer lifting edge and said substantially planer retention edge are concave with respect to each other, and wherein said thumb rest acts to cause a force which is substantially perpendicular to at least a portion of said blade element.

10. A taxidermy and field-use micro cutting system as described in claim 9 wherein said single hole, tailless frame member presents a spatial relation with respect to a cutting surface when used with a finger through said single hole, wherein said substantially planer lifting edge and said substantially planer retention edge each form an angle with respect to said cutting surface when said single hole, tailless frame member is positioned in said spatial relation, and wherein said angle of said substantially planer lifting edge with respect to said cutting surface is less than 90 degrees while the angle of said substantially planer retention edge with respect to said cutting surface is about 90 degrees.

11. A taxidermy and field-use micro cutting system as described in claim 10 wherein said offset second flaired separator forms a blade body concave feature, wherein said blade element forms an edge concave feature, and wherein said edge concave feature and said blade body concave feature are configured to align with said hide when in use.

12. A taxidermy and field-use micro cutting system as described in claim 1 wherein said blade element comprises a replaceable blade.

13. A taxidermy and field-use micro cutting system as described in claim 12 wherein said blade body member comprises a slit adapted for insertion of said replaceable blade and a retaining element wherein said replaceable blade is adapted to be held against said blade body member by said retaining element.

14. A taxidermy and field-use micro cutting system as described in claim 13 wherein said retaining element comprises a single retaining element.

15. A method of taxidermy and field-dress cutting comprising the steps of:

a. manually holding a cutting instrument, having at least one finger hole defining a central rotational axis;

b. inserting at least a portion of said cutting instrument under a hide of an animal;

c. pressing a thumb against a thumb rest portion of said cutting instrument adjacent said finger hole to resist rotation about said central rotational axis;

d. pressing a finger against a frictionally enhanced portion on said cutting instrument adjacent said single hole and diametrically opposed with respect to said thumb rest portion, to further resist rotation about said central rotational axis;

e. cutting at least a portion of said hide through action of said cutting instrument.

16. A method of taxidermy and field-dress cutting as described in claim 15 wherein said step of pressing a thumb against a portion of said cutting instrument and said step of pressing a finger against a frictionally enhanced portion of said cutting instrument act to accomplish the step of creating roughly orthogonal forces on said cutting instrument.

17. A method of taxidermy and field-dress cutting as described in claim 15 wherein said cutting instrument has a blade and a blade body member having a slit adapted for insertion of said replaceable blade and a retaining element, and further comprising the steps of:

a. removing said blade from said blade body member;

b. replacing said blade with a replacement blade;

c. inserting said replacement blade in said slit in said blade body member; and d. retaining said replacement blade in said blade body member.

\* \* \* \* \*